(12) United States Patent
Erkocak

(10) Patent No.: US 11,879,280 B2
(45) Date of Patent: Jan. 23, 2024

(54) LUGGAGE COMPARTMENT LOCKING MECHANISM PROVIDING REMOTE CONTROL

(71) Applicant: MAKERSAN MAKINA OTOMOTIV SANAYI TICARET ANONIM SIRKETI, Kocaeli (TR)

(72) Inventor: Levent Erkocak, Kocaeli (TR)

(73) Assignee: MAKERSAN MAKINA OTOMOTIV SANAYI TICARET ANONIM SIRKETI, Kocaeli (TR)

(*) Notice: Subject to any disclaimer, the term of this patent is extended or adjusted under 35 U.S.C. 154(b) by 286 days.

(21) Appl. No.: 17/426,099

(22) PCT Filed: Feb. 15, 2019

(86) PCT No.: PCT/TR2019/050107
§ 371 (c)(1),
(2) Date: Jul. 28, 2021

(87) PCT Pub. No.: WO2020/167265
PCT Pub. Date: Aug. 20, 2020

(65) Prior Publication Data
US 2022/0098904 A1    Mar. 31, 2022

(51) Int. Cl.
*E05B 83/22*      (2014.01)
*B60R 25/24*      (2013.01)
(Continued)

(52) U.S. Cl.
CPC .............. *E05B 83/22* (2013.01); *B60R 25/24* (2013.01); *E05B 81/04* (2013.01); *E05B 81/10* (2013.01);
(Continued)

(58) Field of Classification Search
CPC .......... E05B 83/22; E05B 81/04; E05B 81/10; E05B 81/25; E05B 81/28; E05B 81/56;
(Continued)

(56) References Cited

U.S. PATENT DOCUMENTS 5,174,619 A * 12/1992 Bender .................. E05B 81/04
                                                                    70/279.1
6,708,537 B1 * 3/2004 Eschweiler ............ E05B 81/04
                                                                    292/DIG. 31
(Continued)

FOREIGN PATENT DOCUMENTS

EP       2011939 A1      1/2009
EP       2325423 A1 *    5/2011    ............. E05B 85/12
(Continued)

OTHER PUBLICATIONS

Paul Heney, "What are pneumatic cylinders?," Sep. 26, 2012, Pneumatic Tips, https://www.pneumatictips.com/what-are-pneumatic-cylinders/ (Year: 2012).*

(Continued)

*Primary Examiner* — Kristina R Fulton
*Assistant Examiner* — Emily G. Brown
(74) *Attorney, Agent, or Firm* — Bayramoglu Law Offices LLC

(57) ABSTRACT

A locking mechanism for luggage compartment doors of vehicles for operating a plurality of connection rods associated with auxiliary drivers includes a main body; a rotary driver arranged to drive, in use, the plurality of connection rods; a handle body associated with a transmission element rigidly joined to the handle body to transmit displacement of the handle body to the rotary driver; and a longitudinal lock guide arranged to displace to selectively enable a retaining means associated with a guiding member bear against the transmission element's tip portion to drive the rotary driver.

(Continued)

The locking mechanism includes a remote actuation means which is arranged to move a portion of the rotary driver for a rotational movement of the rotary driver to operate the plurality of connection rods.

16 Claims, 16 Drawing Sheets

(51) Int. Cl.
    *E05B 81/04*     (2014.01)
    *E05B 81/10*     (2014.01)
    *E05B 81/24*     (2014.01)
    *E05B 81/28*     (2014.01)
    *E05B 81/56*     (2014.01)
    *E05B 81/90*     (2014.01)

(52) U.S. Cl.
    CPC .............. *E05B 81/25* (2013.01); *E05B 81/28* (2013.01); *E05B 81/56* (2013.01); *E05B 81/90* (2013.01)

(58) Field of Classification Search
    CPC .......... E05B 81/90; E05B 85/10; E05B 79/22; B60R 25/24
    See application file for complete search history.

(56) References Cited

U.S. PATENT DOCUMENTS

| | | |
|---|---|---|
| 7,165,799 B2 | 1/2007 | Crean |
| 2008/0134734 A1 | 6/2008 | Lee |
| 2013/0152643 A1 | 6/2013 | Stuckey et al. |
| 2019/0271179 A1* | 9/2019 | Patane .................... E05B 81/36 |

FOREIGN PATENT DOCUMENTS

| | | | | |
|---|---|---|---|---|
| EP | 2325423 A1 | | 5/2011 | |
| FR | 2480841 A1 | * | 10/1981 | ........... B62D 33/037 |
| JP | S6261860 U | | 4/1987 | |
| WO | WO-2017006164 A1 | * | 1/2017 | ........... B62D 33/037 |

OTHER PUBLICATIONS

Espacenet machine translation of FR 2480841 A1, generated Jul. 3, 2023 (Year: 2023).*

* cited by examiner

LUGGAGE COMPARTMENT LOCKING MECHANISM PROVIDING REMOTE CONTROL

CROSS REFERENCE TO THE RELATED APPLICATIONS

This application is the national phase entry of International Application No. PCT/TR2019/050107, filed on Feb. 15, 2019, the entire contents of which are incorporated herein by reference.

TECHNICAL FIELD

The present invention relates to a locking mechanism operating a plurality of luggage compartment auxiliary drivers in vehicles and more particularly relates to a luggage compartment locking mechanism that enables a remote-control operation especially in buses.

BACKGROUND

Devices for operating a plurality of luggage compartment flap locks in buses are known in the art. Those devices are designed in the manner to operate a plurality of locks at the same and to enable access to operate the mechanism from inside the compartment.

It is known in the art that luggage compartment locking mechanisms are used to lock or unlock a handle of the luggage compartment. Among others, a prior art patent publication relevant to the technical field of the present invention can be referred to as US2008134734 (A1), disclosing an opening and closing apparatus of a luggage compartment door of a vehicle includes: a case mounted to the door; a handle in the case; a rod connected to the handle; a first plate mounted to the case, and rotatable in response to movement of the rod; a first link, movable in response to rotation of the first plate to unlatch the door; and a keyhole in the case.

In any case, the user has to go the handle of the locking mechanism to operate it. Further, the user has to completely open the handle to operate the locking system to bring to an "opened state". Since a plurality of the connection rods has to be controlled, a significant amount of force to be need for operating the handle can also be challenging. Moreover, there is no fully automated locking system for a luggage compartment.

SUMMARY

Primary object of the invention is to provide a remote-control option in a luggage compartment locking mechanism such that the user can operate the connection rods of the axillary drivers only by pushing a button from outside the locking mechanism without any interference with the locking mechanism.

Another object of the present invention is to provide a luggage compartment locking mechanism in which manual operation is fully eliminated by providing a remote-control option.

Another object of the present invention is to provide a luggage compartment locking mechanism which is sufficient to operate the locking mechanism by only slightly pressed.

Another object of the present invention is to provide a luggage compartment locking mechanism which allows to be operated by a remote-control device.

Another object of the present invention is to provide a luggage compartment locking mechanism suitable for operating up to six locks from inside and outside the compartment respectively, ensuring a flexible locking mechanism adaptable to a variety of configurations required by different bus models.

The desired arrangement is also to be simple to handle and, with regard to its other functional characteristics, is to fully satisfy the existing requirements.

The present invention proposes a locking mechanism for luggage compartment doors of vehicles for operating a plurality of connection rods associated with auxiliary drivers, comprising: a main body; a rotary driver for driving the plurality of connection rods;

a handle body associated with a transmission element rigidly joined to said handle body to transmit displacement of said handle body to the rotary driver; and a longitudinal lock guide arranged to displace to selectively enable a retaining means associated with a guiding member bear against a tip portion of said transmission element to drive said rotary driver; and an elevator element slidably movable on said guiding member by said transmission element, wherein the elevator element is connected to a connection lever for rotating said rotary driver. Said locking mechanism comprises a remote actuation means which is arranged to move, in use, the rotary driver to control the plurality of connection rods from outside the locking mechanism; and a micro switch in relation with a micro switch protrusion for triggering the remote actuation means when the micro switch protrusion is moved away, wherein the micro switch protrusion is arranged on said elevator element.

BRIEF DESCRIPTION OF THE DRAWINGS

Accompanying drawings are given solely for the purpose of exemplifying a locking mechanism for a luggage compartment whose advantages over prior art were outlined above and will be explained in detail hereinafter.

PART NUMBERS

Figure 1:
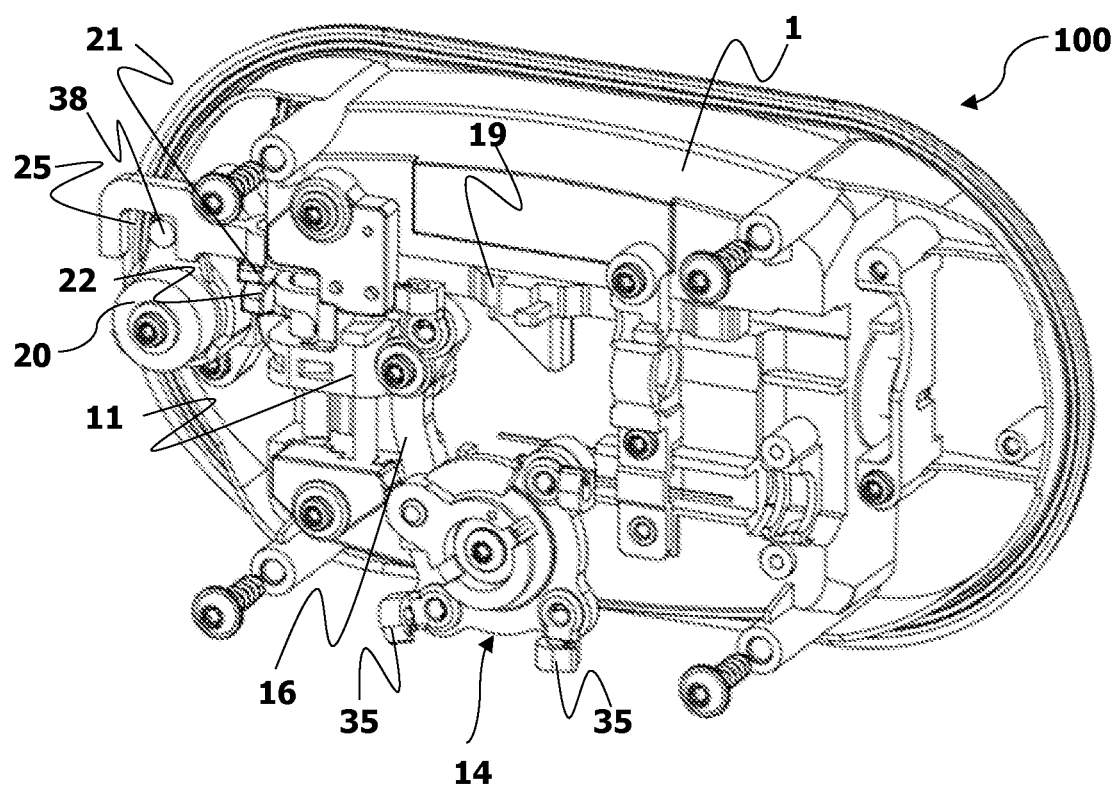
FIG. 1 demonstrates a rear perspective view of the locking mechanism without a remote-control mechanism.

1. Main body
2. Front plate
3. Micro switch
3a. Micro switch pin
4. Fastening plate
5. Attachment member
6. Movable part
7. Remote actuation means
8. Fastening member
9. Abutment portion
10b. Actuator assembly
11. Elevator element
12. Connection member
13. Handle body
14. Rotary driver
16. Connection lever
17. Actuator plate
18. Guiding member
19. Longitudinal lock guide
20. Tongue
21. Transmission element
22. Retaining means
23. Spring
25. Cavity
26. Tongue protrusion
27. Spring element
28. Elevator element housing
29. Closed region
30. Auxiliary drivers
31. Abutting portion
32. Locking protrusion
33. Housing of remote actuation means
34. Connection rod
35. Connection slot
36. Recess
38. Key hole device protrusion
39. Micro switch protrusion
40. Lock hole
100. Locking mechanism

DETAILED DESCRIPTION OF THE EMBODIMENTS

Referring now to the figures outlined above, the present invention proposes a locking mechanism (100) for luggage compartment doors of vehicles for operating a plurality of connection rods (34) associated with auxiliary drivers (30), comprising: a main body (1); a rotary driver (14) arranged to drive, in use, the plurality of connection rods (34); a handle body (13) associated with a transmission element (21) rigidly joined to said handle body (13) to transmit displacement of said handle body (13) to the rotary driver (14); and a longitudinal lock guide (19) arranged to displace to selectively enable a retaining means (22) associated with a guiding member (18) bear against said transmission element's (21) tip portion to drive said rotary driver (14). Said locking mechanism (100) comprises a remote actuation means (7) which is arranged to move a portion of the rotary driver (14) for a rotational movement of the rotary driver (14) to operate the plurality of connection rods (34). An elevator element (11) has an elevator element housing (28) in which the retaining means (22) is kept when the locking mechanism (100) is brought into a closed position. Said elevator element (11) is slidably moved on said guiding member (18) by said transmission element (21), said elevator element (11) being connected to a connection lever (16) for rotating said rotary driver (14).

Figure 3:
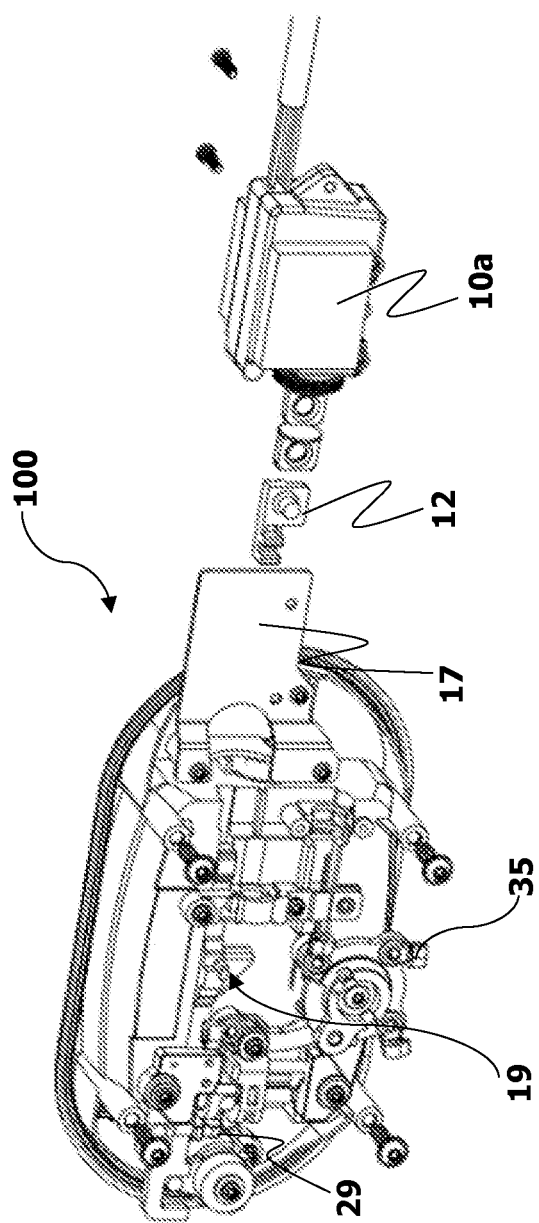
FIG. 3 demonstrates a rear perspective view of the locking mechanism shown in FIG. 1 with the actuator assembly and without a remote-control mechanism.
Figure 4:
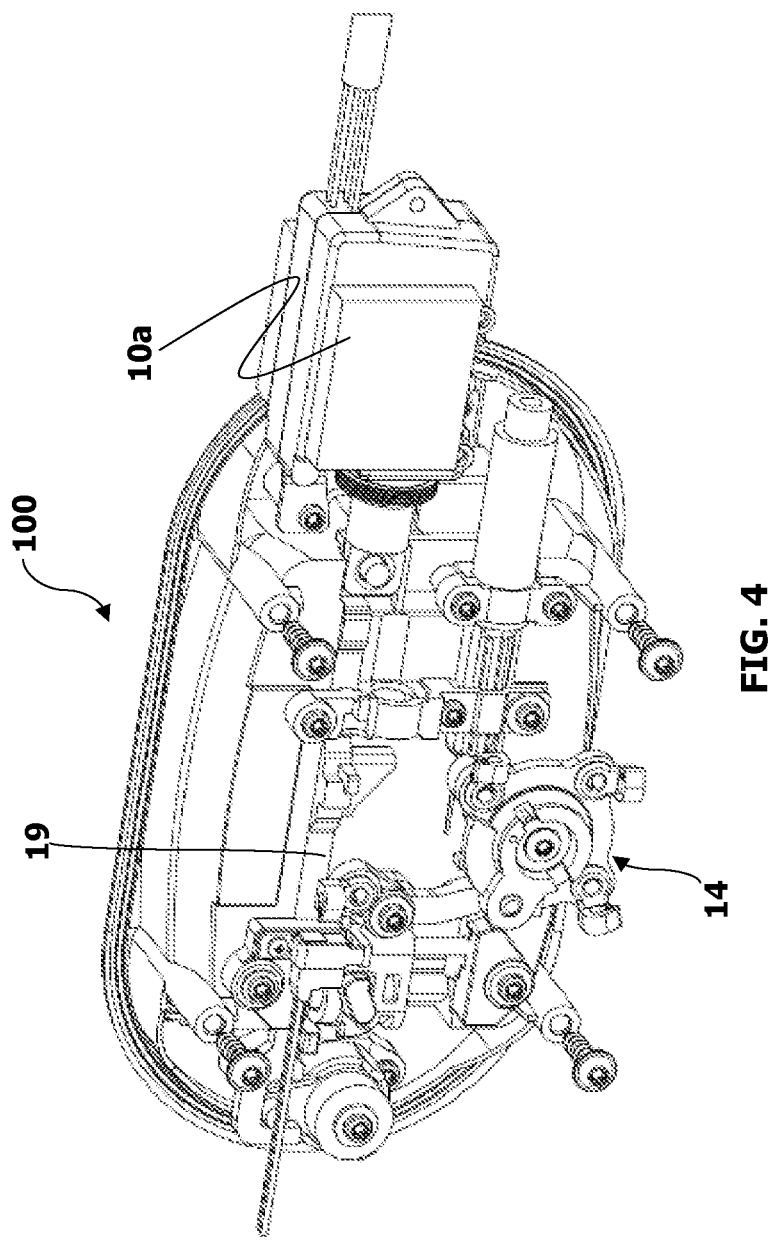
FIG. 4 demonstrates a rear perspective view of the locking mechanism shown in FIG. 1 with the actuator assembly which is assembled to the main body.

According to the present invention, the locking mechanism (100) can be moved by an actuator assembly (10a, 10b) or a keyhole device (not shown). Referring to the FIGS. 3 and 4, said actuator assembly (10a) is an electric linear actuator that can be actuated by an electric response and the actuator assembly (10a) has a connection member (12) engageable with a portion of the longitudinal lock guide (19). Said actuator assembly (10a) can be attached over an actuator plate (17) which is firmly is attached to the main body (1) of the locking mechanism (100). Said connection member (12) can have a threaded portion which is shaped and dimensioned with respect to a portion of the longitudinal lock guide (19) and further have a connection protrusion arranged pass from a hole of a connection part of the actuator assembly (10a). Said actuator assembly (10a) can transmit the movement to the longitudinal lock guide (19) via said connection member (12). When the longitudinal lock guide (19) is moved to an open position, the retaining means (22) associated with a guiding member (18) comes into engagement with the transmission element's (21) tip portion to drive said rotary driver (14) as shown FIGS. 1, 3 and 4.

Figure 5:
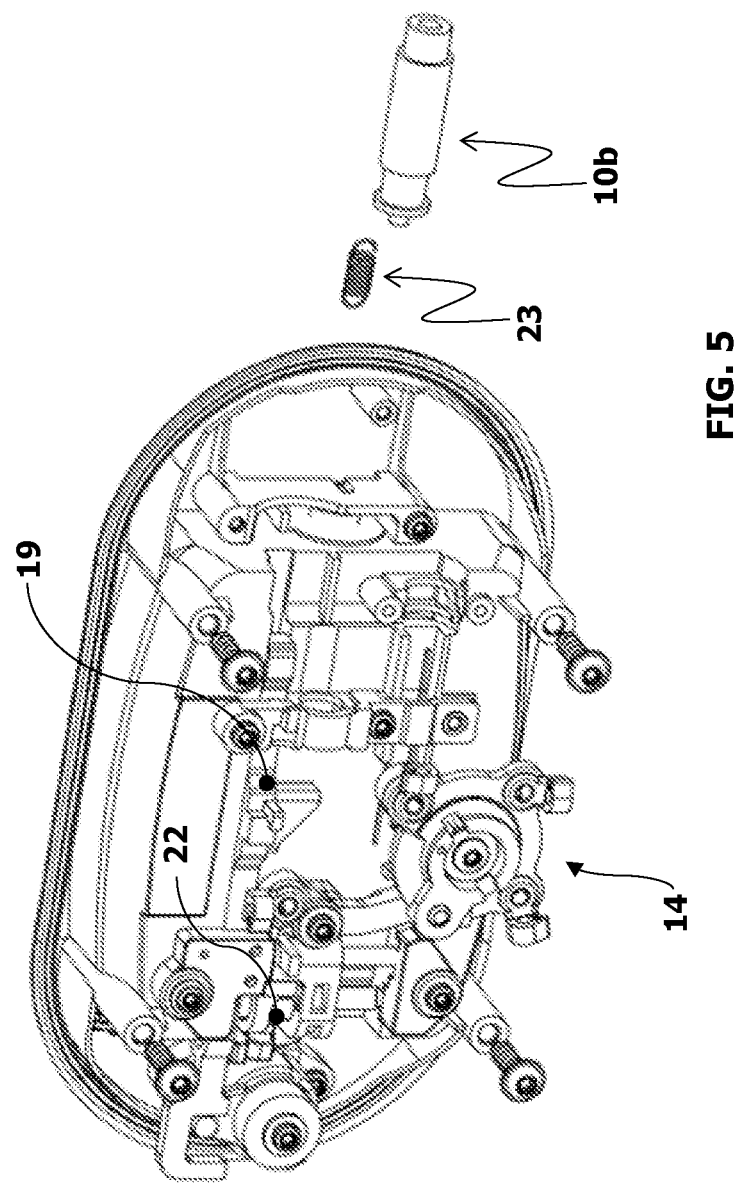
FIG. 5 demonstrates a rear perspective view of the locking mechanism shown in FIG. 1 with the actuator assembly as a pneumatic linear actuator.
Figure 6:
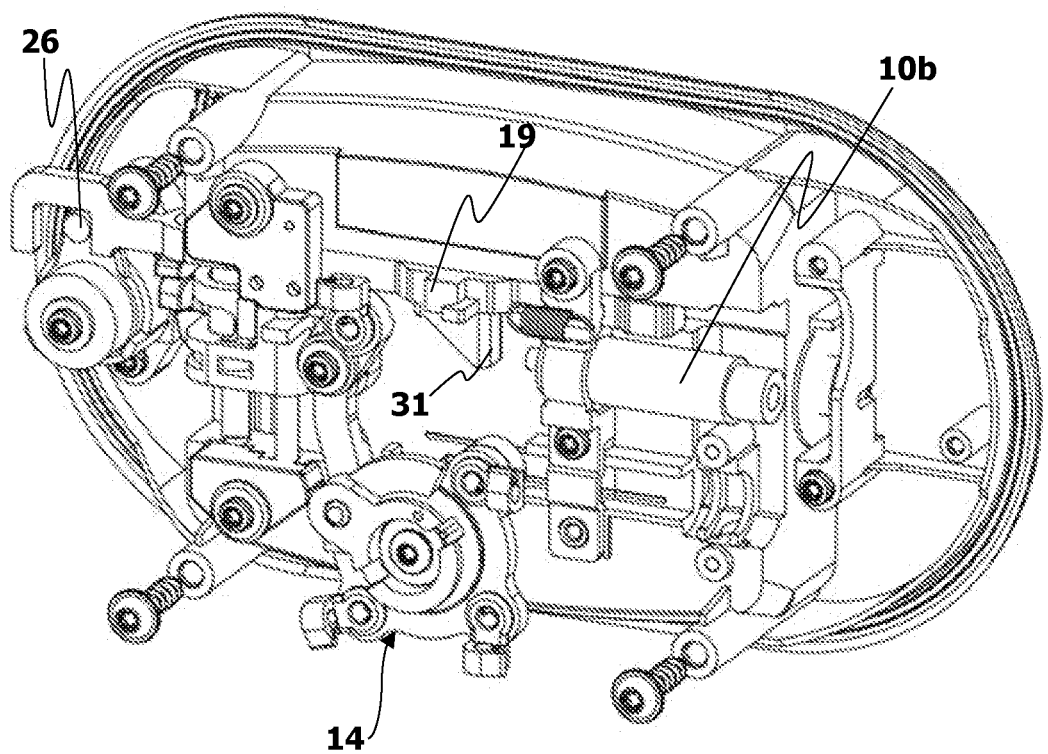
FIG. 6 demonstrates a rear perspective view of the locking mechanism shown in FIG. 5 with the actuator assembly which is assembled to the main body.
Figure 7:
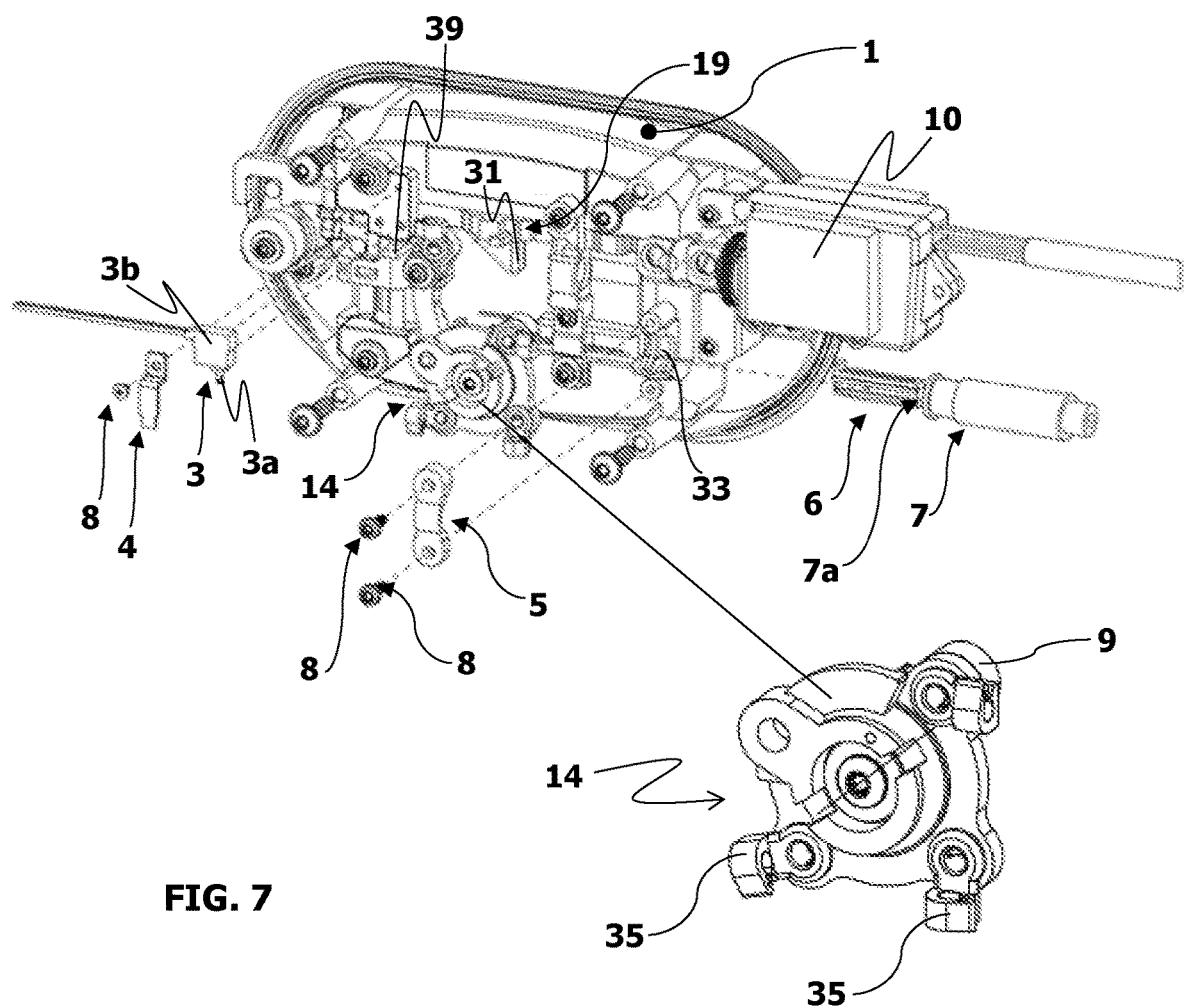
FIG. 7 demonstrates a rear perspective view of the locking mechanism with a remote-control means being dismantled according to the present invention where the rotary driver is enlarged in view.

In a possible embodiment, the actuator assembly (10b) can be a pneumatic linear actuator having a piston inside a hollow cylinder and wherein the longitudinal lock guide (19) has an abutting portion (31) arranged to be pushed by said piston of the pneumatic linear actuator as shown in FIGS. 5, 6 and 7. Said abutting portion (31) is formed as a protrusion that extends outwardly from the longitudinal lock guide (19) whereby a tip portion of the piston of the actuator assembly (10b) pushes said longitudinal lock guide (19) from said abutting portion (31).

Figure 16:
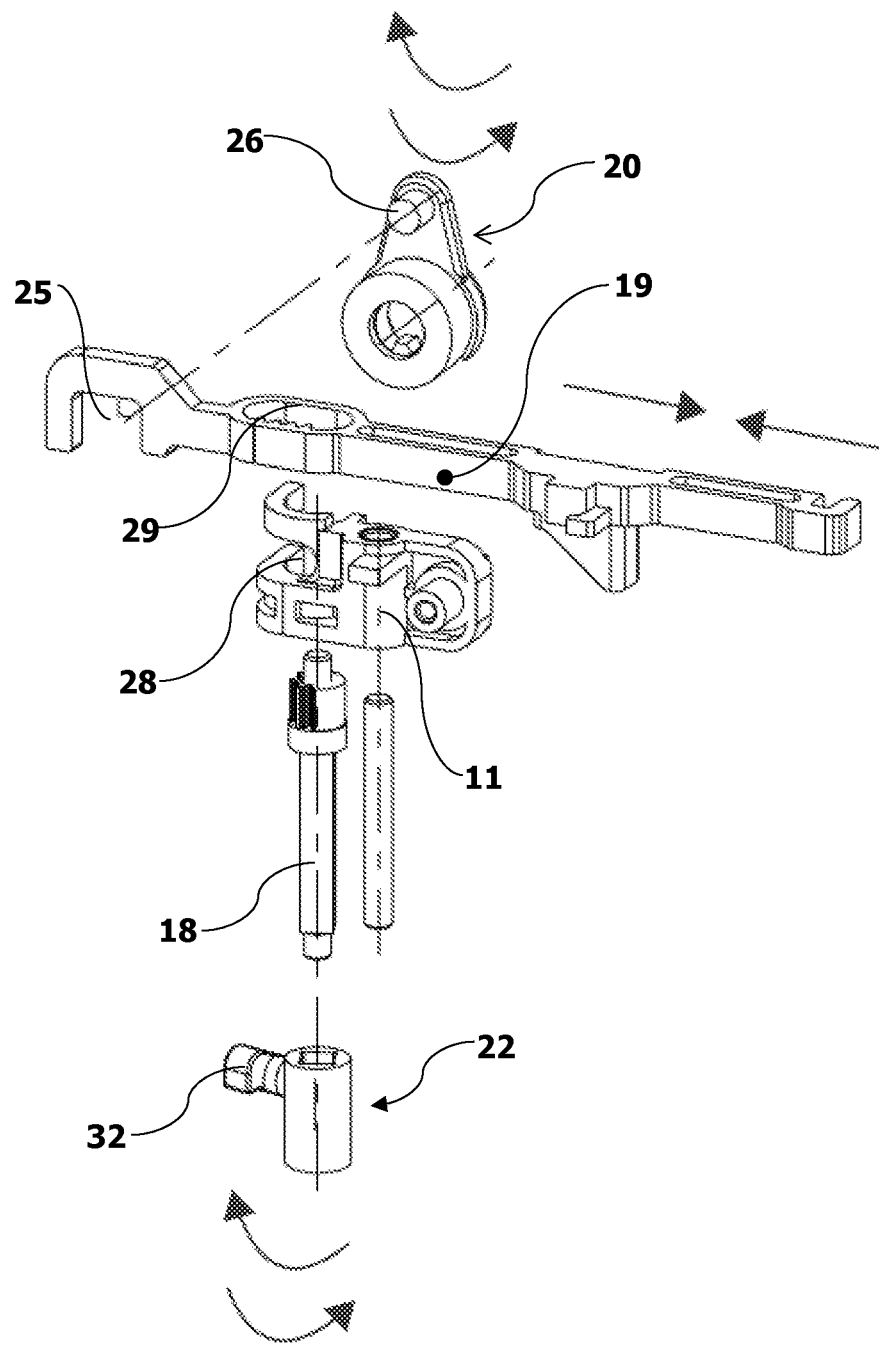
FIG. 16 demonstrates perspective view of the individual elements of the locking system according to the present invention.

Referring to the FIG. 16, said longitudinal lock guide (19) can have a closed region (29) having inner threads in communication with threads of an upper circumferential area of said guiding member (18) whereby linear displacement of said longitudinal lock guide (19) provides rotation of said actuator guiding body (18) around its longitudinal axis so said retaining means (22) also rotates which is attached to the actuator guiding body (18). Said retaining means (22) has a main body into which said actuator guiding body (18) passes, and has a locking protrusion (32) which can be brought into engagement with the tip portion of the transmission element. Referring to the FIGS. 3 and 4, said locking protrusion (32) is in communication with the transmission element (21) (the locking system is an open state), when the user presses a handle body (13), the movement of the handle body (13) is transmitted to the retaining means (22) via said transmission element (21) to rotate the rotary driver (14).

Figure 2:
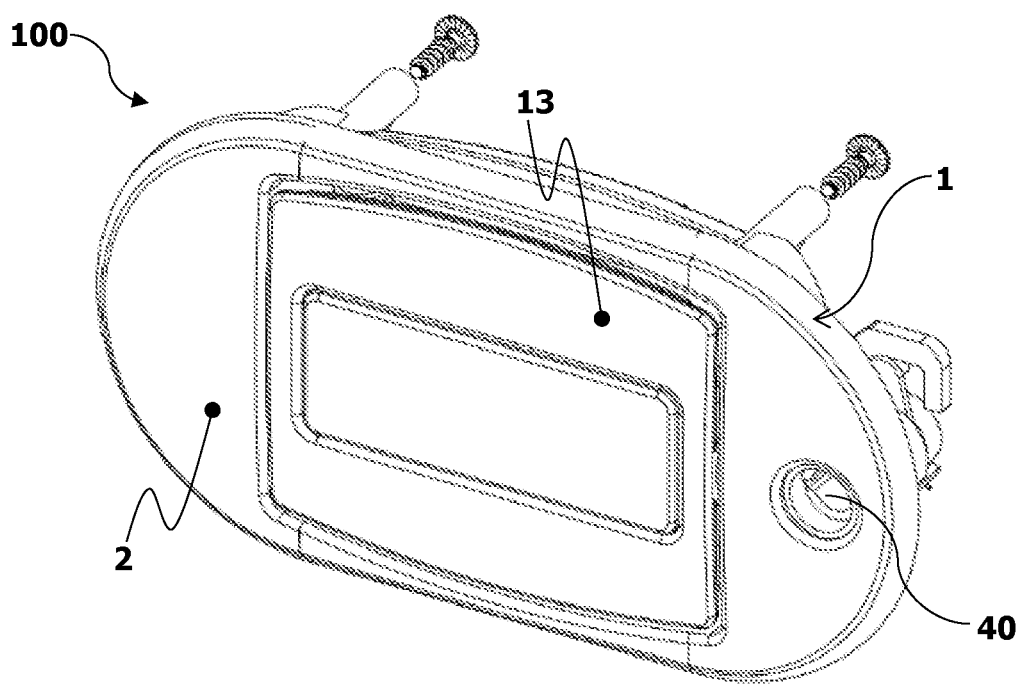
FIG. 2 demonstrates a perspective view of the locking mechanism body.

In a possible embodiment, referring to the FIG. 2, said locking mechanism (100) comprises a keyhole device (not shown) which actuates a tongue (20), said keyhole device is arranged in a lock hole (40) formed on a front plate (2) of the main body (1) by which said longitudinal lock guide (19) is longitudinally movable back and forth by way of a tongue protrusion (26) of the tongue (20) being disposed in a cavity (25) of said longitudinal lock guide (19). The longitudinal lock guide (19) has a hook shaped portion at an end with said cavity (25) thereof in which said tongue protrusion (26) is guided for actuation of the longitudinal lock guide such that the locking mechanism (100) can be brought into an "open" or a "closed" state by way the key hole device or the actuator assembly (10a) automatically. So, the longitudinal lock guide (19) according to the present invention can also be displaced by means of a key inserted into the key hole device. Rotation of a keyhole device rotates the tongue (20) such that said longitudinal lock guide (19) can be displaced longitudinally back and forth.

The present invention proposes a locking mechanism (100) for luggage compartment doors of vehicles for remote control. Even though, said key hole device and/or the actuator assembly (10a) can brought the locking mechanism (100) to an "open" or a "closed" state, a plurality of connection rods (34) associated with auxiliary drivers (30) are still kept in locked position. Only way to open said doors is to rotate said rotary driver (14) for actuation of the connection rods (34) by pressing the handle body (13) after the locking mechanism is brought into the "open" state.

Referring now to the FIGS. 9-15, the remote actuation means (7) can be an electric linear actuator that can be actuated by an electric response whereby the remote actuation means (7) has a movable part (6) arranged to move an abutment portion (9) of said rotary driver (14) in response. In a possible embodiment, the remote actuation means (7) can be a pneumatic linear actuator having a piston inside a hollow cylinder, and the remote actuation means (7) has a movable part (6) arranged to move an abutment portion (9) of said rotary driver (14) wherein said movable part (6) can be moved by the piston of the pneumatic linear actuator to rotate said rotary driver (14) in response. said remote actuation means (7) is placed on a housing of the main body (1) and the attachment plate (5) is secured over said remote actuation means (7).

Figure 8:
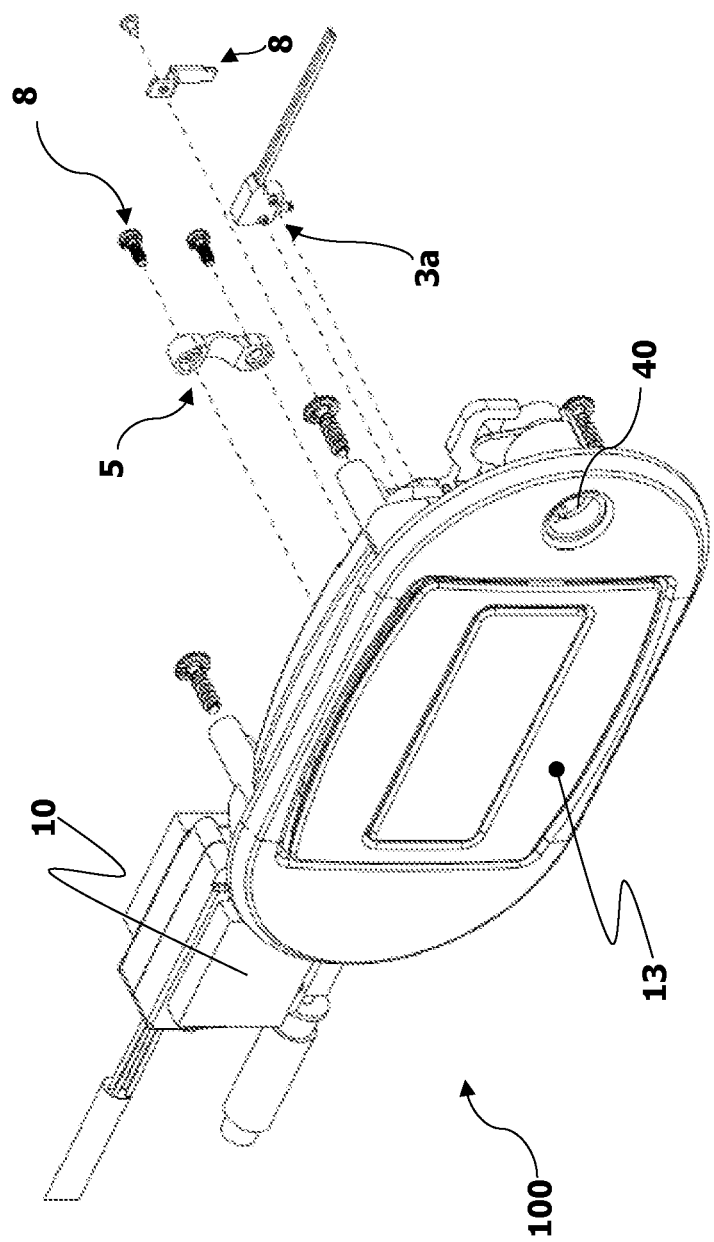
FIG. 8 demonstrates a perspective view of the locking mechanism with a micro switch being dismantled according to the present invention.
Figure 9:
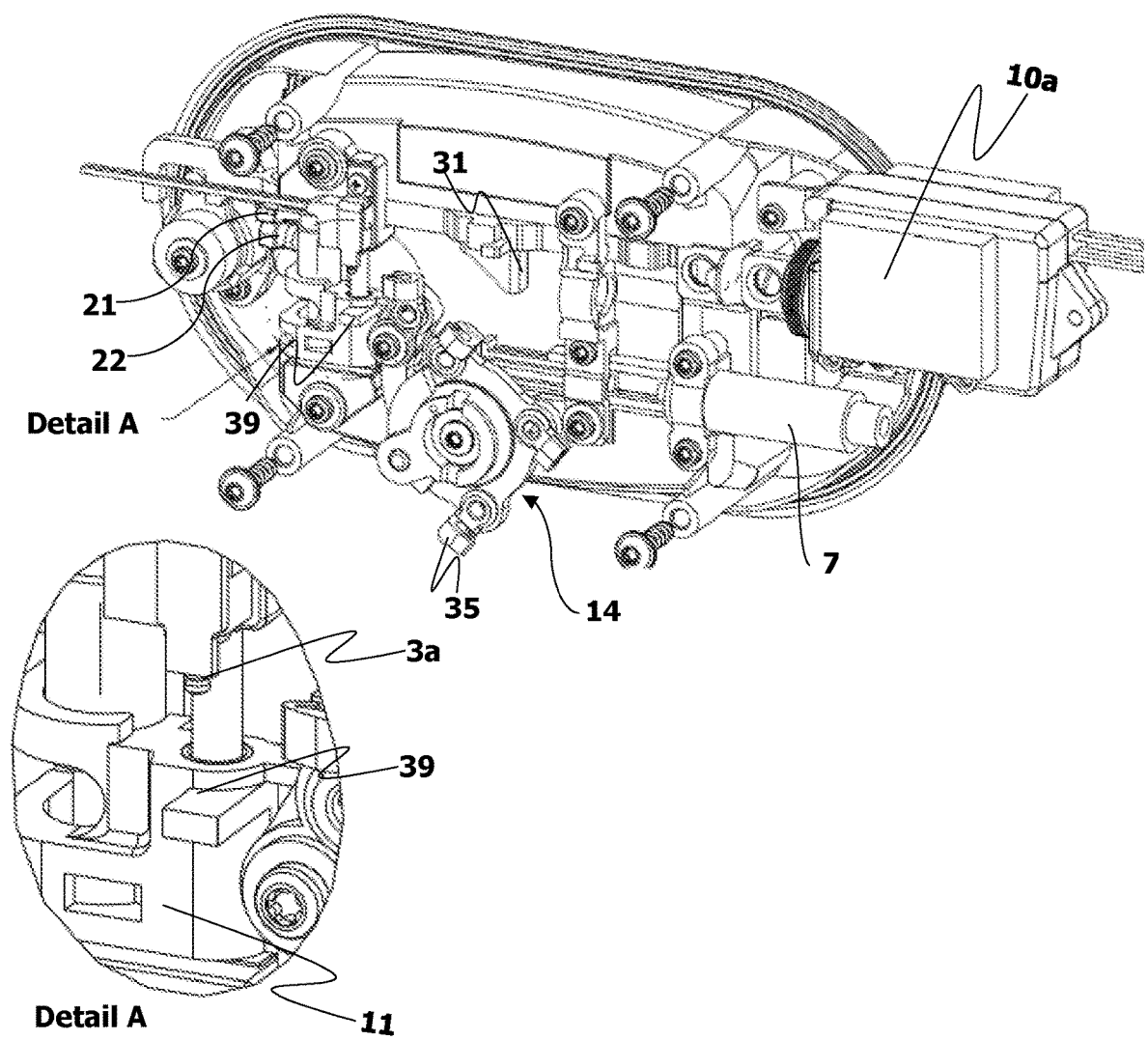
FIG. 9 demonstrates a rear perspective view of the locking mechanism with a remote control means which is rotated by means of a movable part of the remote control means in the counter-clockwise direction according to the present invention, where the micro switch protrusion and a micro switch pin are shown in detail view in Detail A.
Figure 10:
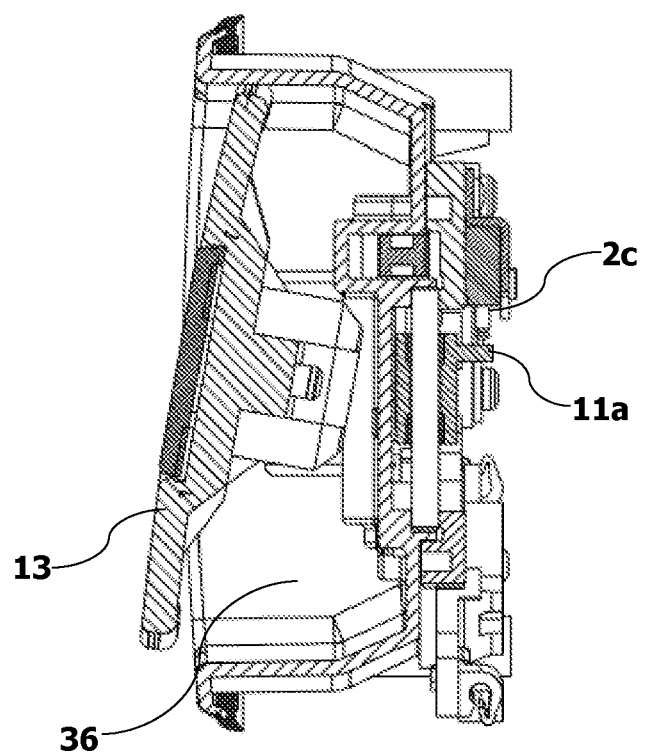
FIG. 10 demonstrates a side cross-sectional view of the locking mechanism body according to the present invention.
Figure 11:
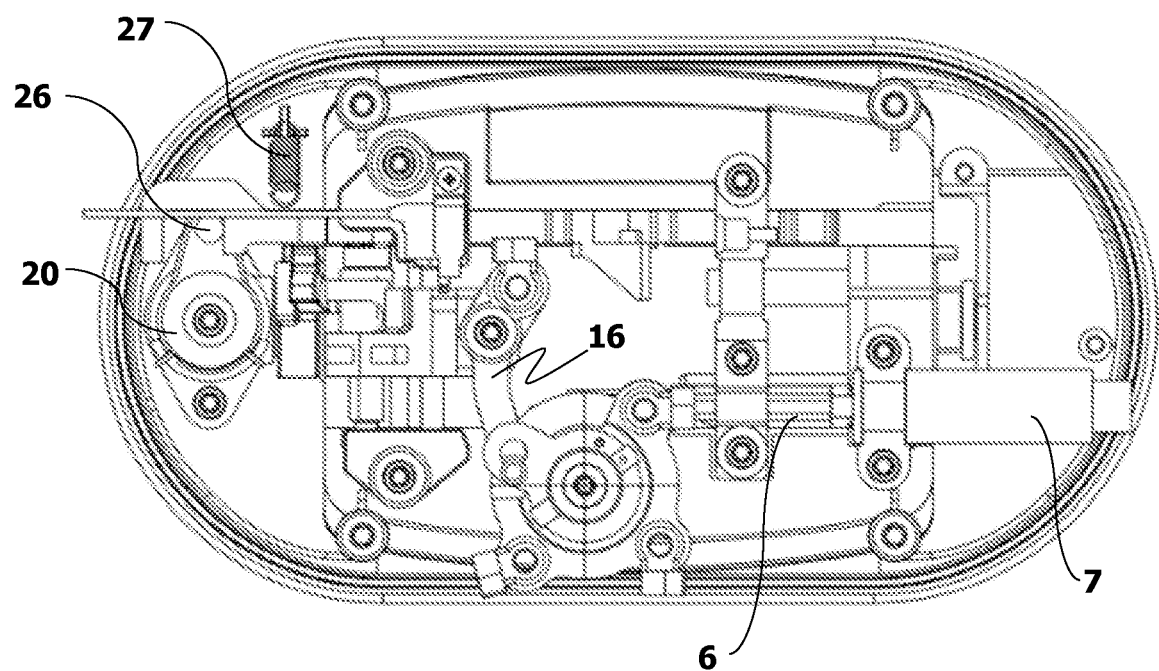
FIG. 11 demonstrates a rear view of the locking mechanism body with an actuator assembly where the locking mechanism is in a "closed state" according to the present invention.
Figure 12:
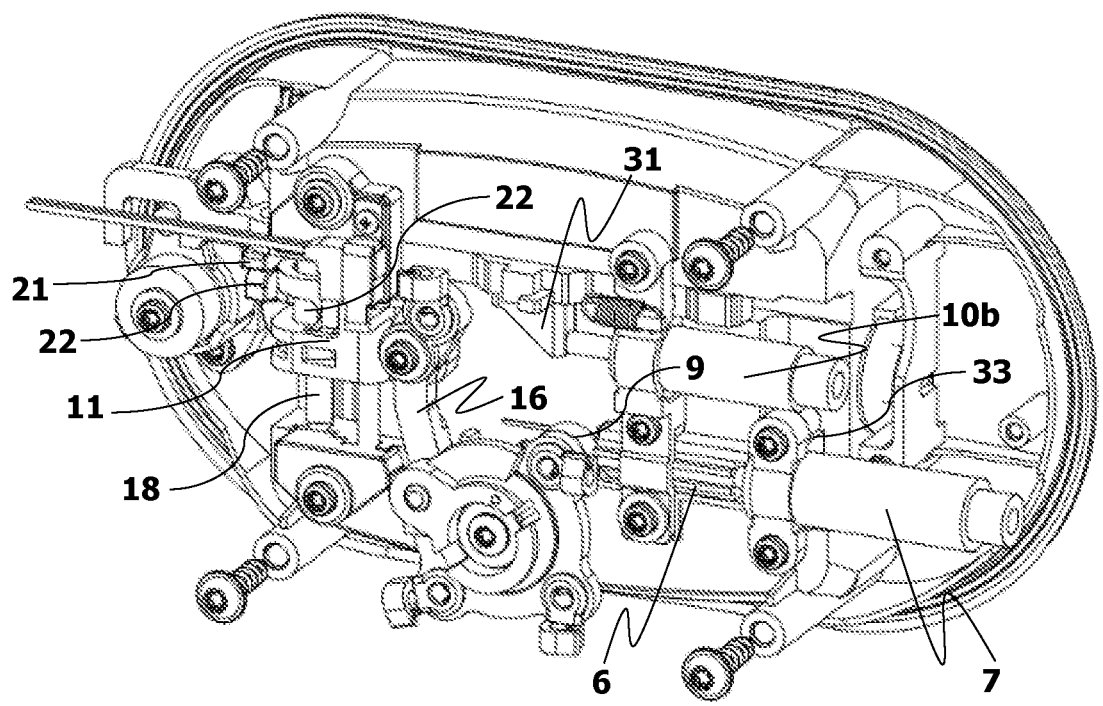
FIG. 12 demonstrates a rear perspective view of the locking mechanism with an actuator assembly as a pneumatic linear actuator and with a remote control means according to another embodiment of the invention where the locking mechanism in a "closed state".
Figure 13:
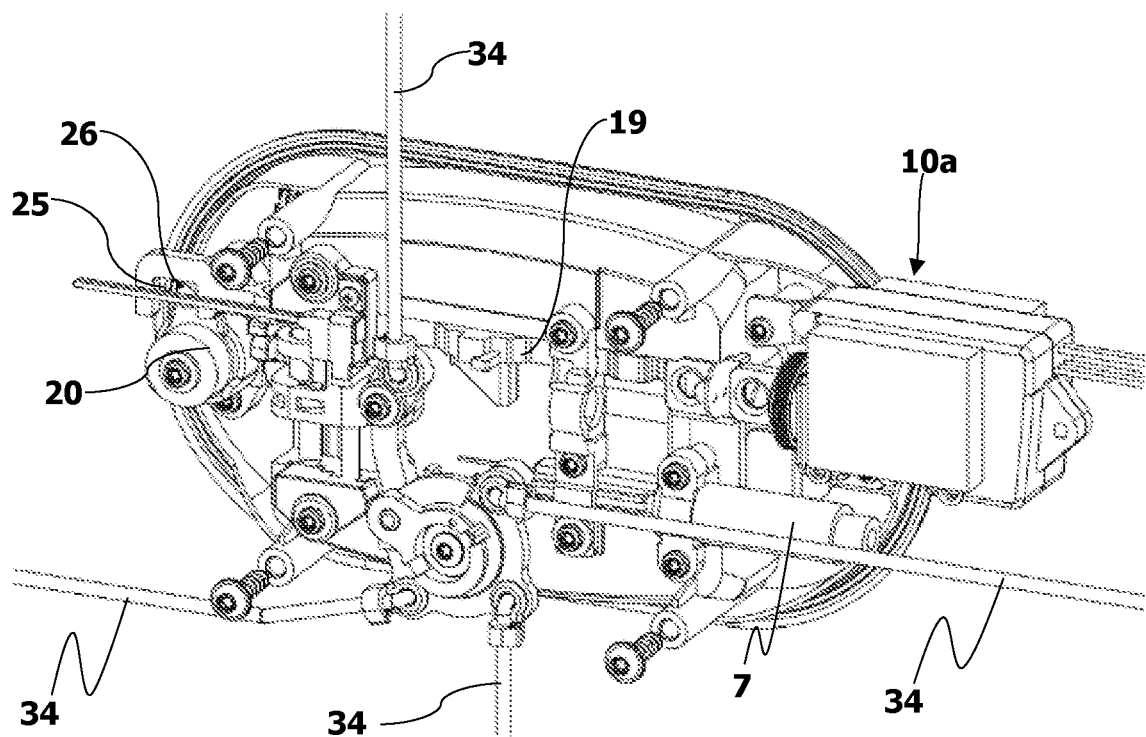
FIG. 13 demonstrates a rear perspective view of the locking mechanism with an actuator assembly as an electric linear actuator and with a remote control means according to another embodiment of the invention where the locking mechanism is in a "closed state".
Figure 14:
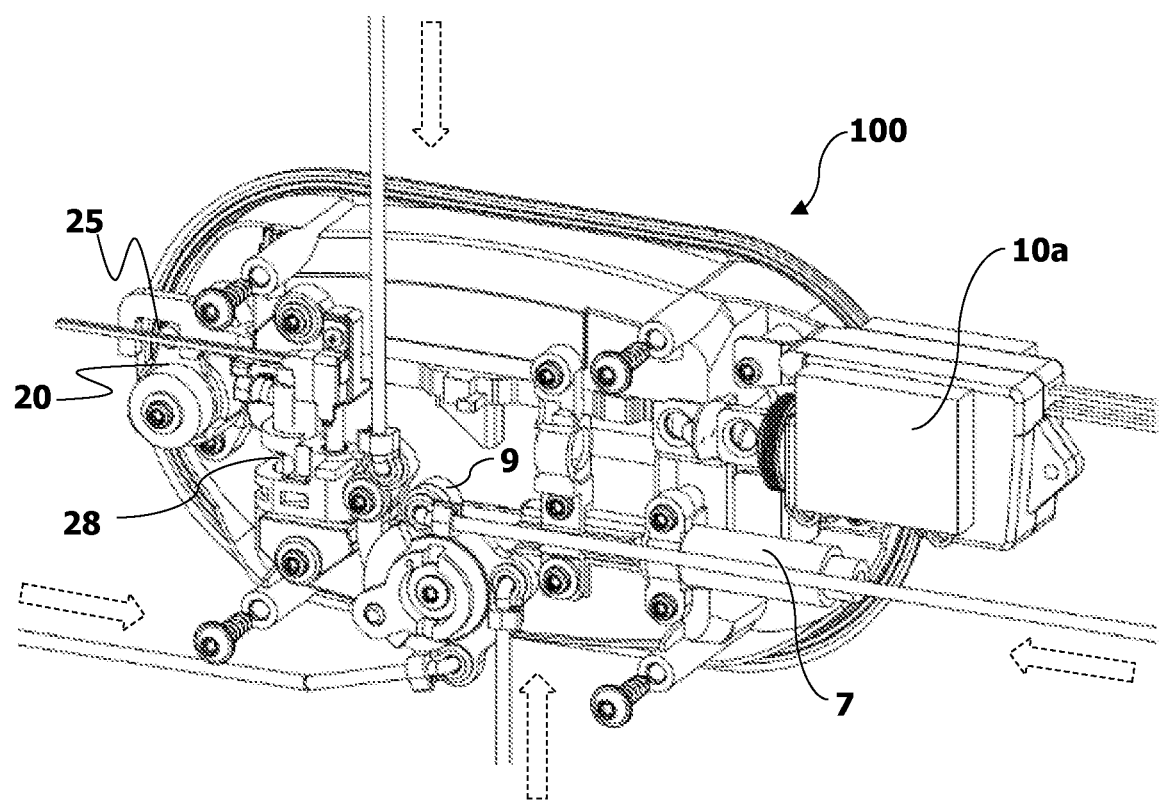
FIG. 14 demonstrates a rear perspective view of the locking mechanism shown in FIG. 13 where the rotary driver is driven by the remote control means according to the present invention.
Figure 15:
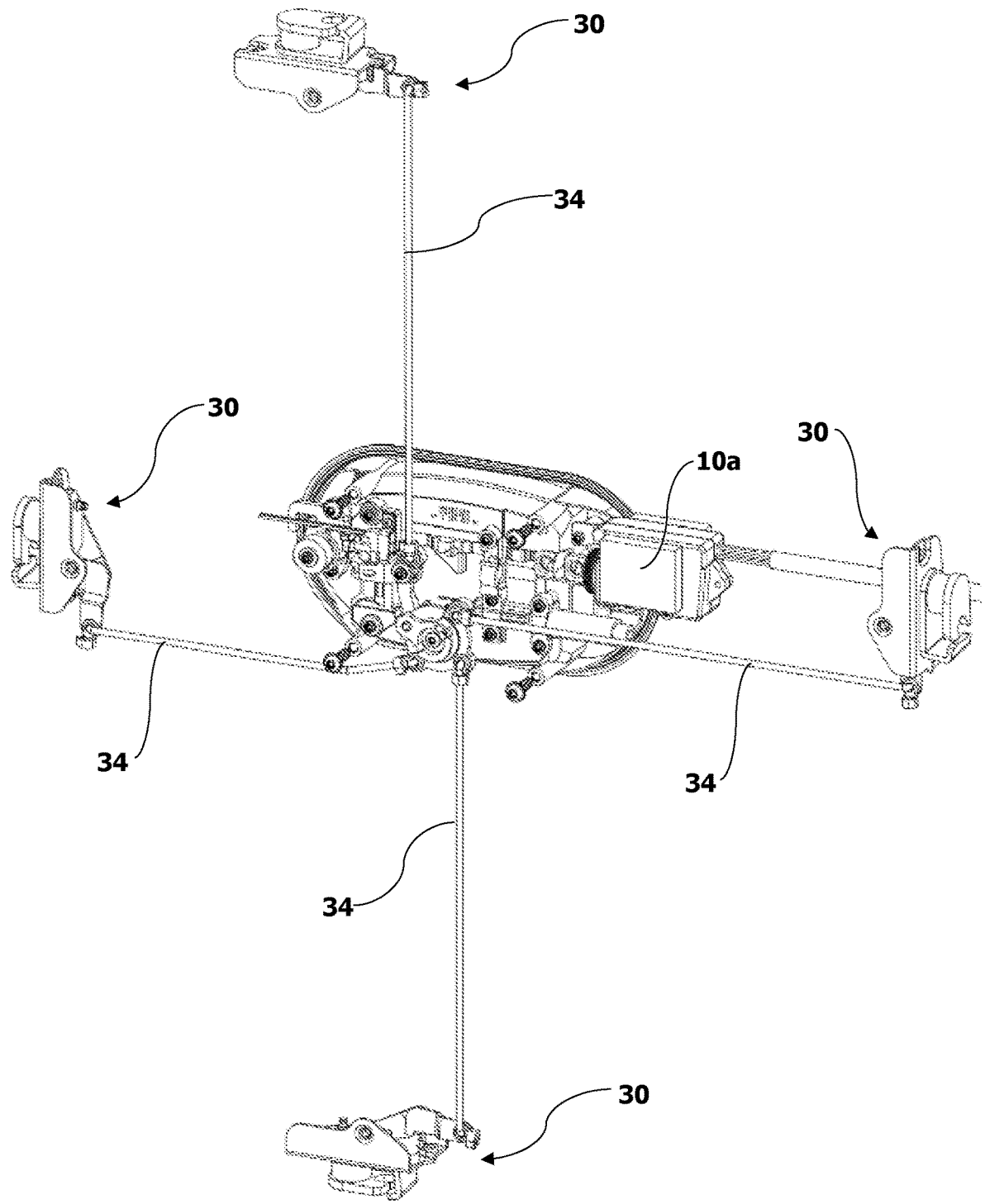
FIG. 15 demonstrates the locking mechanism according to the present invention with connection rods and auxiliary drivers.

Referring to the FIGS. 7 and 8, said remote actuation means (7) is placed on a housing of remote actuation means (33) of the main body (1) whereby an attachment plate (5) is placed over said remote actuation means (7) by fixing to the housing of remote actuation means (33). The housing of remote actuation means (33) can be shaped and dimensioned with respect to a corresponding portion of the remote actuation means (7) and said attachment place (5) can have at least one hole into which a fastening member (8) passes to fix the remote actuation means (7).

Said locking mechanism (100) further comprises a micro switch (3) having a micro switch body in which a micro switch pin (3a) extending partially outside, said micro switch pin (3a) being arranged to be pressed by a micro switch protrusion (39) with respect to the movement of the micro switch (3). Said micro switch protrusion (39) is arranged in the proximity of the micro switch (3), more preferably is arranged on said elevator element (11) that moves with said elevator element (11). The micro switch (3) is configured such that when the micro switch protrusion (39) moves away from said micro switch pin (3a), said micro switch (3) sends signal to said remote actuation means (7) to actuate such that as the user presses the handle body (13), the connection between the micro switch protrusion (39) and the micro switch pin (3a) is lost which results in that the remote actuation means is triggered for rotating the rotary driver (14). With this arrangement, the user can easily open the doors just only pressing the handle body (13). The present invention provides a locking system in which the user can easily control the locking system from outside, a special can be arranged at an interior area of the vehicle (i.e., dashboard). Further, when the user wants to control the locking mechanism (100) by using the handle body (13), said micro switch (3) sense the motion and triggers to remote actuation means to control and easily over the rotary member (14). said micro switch (3) sense the motion as the connection is lost due to micro switch protrusion (39) is moved away from the micro switch pin (3a).

Said transmission element (21) is pivotally coupled to the rotatable front plate (2) through a spring element (27) such that while pushing an upper planar region inwardly displaces said transmission element (21) in the downward direction, pushing a lower planar region has no effect on the same as its displacement is prevented by a longitudinal lock guide (19).

Said longitudinal lock guide (19) is arranged such that it longitudinally displaces to enable said transmission element's (21) tip bear against a retaining means (22). Referring to the FIG. 16, the retaining means (22) can be formed to be a tubular T-form body telescopically engaging with the tubular-form guiding member (18). Longitudinal displacement of said longitudinal lock guide (19) in linear directions (as shown arrows) as in FIG. 16 provides rotation of the guiding member (18) around its longitudinal axis. Rotation of the guiding member (18) also rotates the retaining means (22) upon which said retaining means (22) rotates to bear against said transmission element (21) or releases movement of said transmission element (21).

When the locking protrusion (32) of the retaining means (22) is aligned to face said transmission element (21), displacement of said transmission element (21) moves the elevator element (11) which is guided on the guiding member (18). Said elevator element (11) being pivotally connected to a connection lever (16) therefore rotates the rotary driver (14) itself around a rotation axis of the rotary driver (14). The rotary driver (14) has a plurality of connection slots (35) being placed around the rotary driver (14) which are used for connection with auxiliary drivers (30) by means of connection rods (34). Said rotary driver (14) is rotated by said connection lever (16) against the force of a helical restoring spring (not shown) set up on the axis of said rotary driver (14).

The locking mechanism (100) according to the present invention is also suitable for operating up to six locks from inside and outside the compartment. It therefore provides a flexible locking mechanism adaptable to a variety of configurations required by different bus models with a remote-control option where the user can only press one button to operate said locking mechanism (100).

What is claimed is:

1. A locking mechanism for luggage compartment doors of vehicles for operating a plurality of connection rods associated with auxiliary drivers, comprising:
   a main body;
   a rotary driver for driving the plurality of connection rods;
   a handle body associated with a transmission element rigidly joined to the handle body to transmit a displacement of the handle body to the rotary driver;
   a longitudinal lock guide arranged to displace to selectively enable a retaining means to drive the rotary driver, wherein the retaining means is associated with a guiding member to bear against a tip portion of the transmission element, and wherein the longitudinal lock guide comprises a closed region having inner threads in communication with threads of an upper circumferential area of the guiding member whereby a linear displacement of the longitudinal lock guide provides a rotation of the guiding member around a longitudinal axis of the guiding member;
   an elevator element slidably movable on the guiding member by the transmission element, wherein the elevator element is connected to a connection lever for rotating the rotary driver;
   a remote actuation means, wherein the remote actuation means is arranged to move the rotary driver to control the plurality of connection rods from outside the locking mechanism; and
   a micro switch in relation with a micro switch protrusion for triggering the remote actuation means when the micro switch protrusion is moved away, wherein the micro switch protrusion is arranged on the elevator element.

2. The locking mechanism according to claim 1, wherein the locking mechanism further comprises a first actuator assembly or a second actuator assembly, wherein the first actuator assembly and the second actuator assembly are arranged to move the longitudinal lock guide.

3. The locking mechanism according to claim 2, comprising the first actuator assembly, wherein the first actuator assembly is an electric linear actuator, the electric linear actuator is actuated by an electric response, and the first actuator assembly has a connection member engageable with a portion of the longitudinal lock guide.

4. The locking mechanism according to claim 3, wherein the locking mechanism comprises a keyhole device having a tongue arranged in a lock hole of the main body, wherein by the keyhole device, the longitudinal lock guide is longitudinally movable back and forth by way of a tongue protrusion of the tongue, wherein the tongue is disposed in a cavity of the longitudinal lock guide.

5. The locking mechanism according to claim 2, comprising the second actuator assembly wherein the second actuator assembly is a pneumatic linear actuator having a piston inside a hollow cylinder, wherein the longitudinal lock guide has an abutting portion arranged to be pushed by the piston of the pneumatic linear actuator.

6. The locking mechanism according to claim 5, wherein the locking mechanism comprises a keyhole device having a tongue arranged in a lock hole of the main body, wherein by the keyhole device, the longitudinal lock guide is longitudinally movable back and forth by way of a tongue protrusion of the tongue, wherein the tongue is disposed in a cavity of the longitudinal lock guide.

7. The locking mechanism according to claim 2, wherein the locking mechanism comprises a keyhole device having a tongue arranged in a lock hole of the main body, wherein by the keyhole device, the longitudinal lock guide is longitudinally movable back and forth by way of a tongue protrusion of the tongue, wherein the tongue is disposed in a cavity of the longitudinal lock guide.

8. The locking mechanism according to claim 1, wherein the locking mechanism comprises a keyhole device having a tongue arranged in a lock hole of the main body, wherein by the keyhole device, the longitudinal lock guide is longitudinally movable back and forth by way of a tongue protrusion of the tongue, wherein the tongue is disposed in a cavity of the longitudinal lock guide.

9. The locking mechanism according to claim 1, wherein the remote actuation means is an electric linear actuator actuated by an electric response, wherein by the electric response, the remote actuation means has a movable part arranged to move an abutment portion of the rotary driver in response.

10. The locking mechanism according to claim 1, wherein the remote actuation means is a pneumatic linear actuator having a piston inside a hollow cylinder, the remote actuation means having a movable part arranged to move an abutment portion of the rotary driver wherein the movable part can be moved by the piston of the pneumatic linear actuator to rotate the rotary driver in response.

11. The locking mechanism according to claim 1, wherein the remote actuation means is placed on a housing of the main body, and an attachment plate is secured over the remote actuation means.

12. The locking mechanism according to claim 1, wherein the elevator element has an elevator element housing, wherein the retaining means is kept in the elevator element housing when the locking mechanism is brought into a closed position.

13. A locking mechanism according to claim 12, wherein the locking mechanism further comprises the micro switch having a micro switch body, wherein a micro switch pin extends partially outside, the micro switch pin is arranged to be pressed by the micro switch protrusion, and the micro switch protrusion is arranged in a proximity of the micro switch.

14. The locking mechanism according to claim 13, wherein the micro switch protrusion is provided on the elevator element and moves with the elevator element.

15. The locking mechanism according to claim 13, wherein the micro switch is configured to send a signal to the remote actuation means to actuate when the micro switch protrusion moves away from the micro switch pin.

16. The locking mechanism according to claim 1, wherein the remote actuation means is arranged to move a portion of the rotary driver for a rotational movement of the rotary driver to operate the plurality of connection rods.

* * * * *